United States Patent
Kim et al.

(10) Patent No.: US 12,281,401 B2
(45) Date of Patent: Apr. 22, 2025

(54) COMPOSITE SHEET FOR SHIELDING ELECTROMAGNETIC AND RADIATING HEAT INCLUDING GRAPHENE SHEET

(71) Applicant: BESTGRAPHENE CO., LTD, Yeoju-si (KR)

(72) Inventors: Myeong Gi Kim, Yeoju-si (KR); Sung Min Hong, Yeoju-si (KR)

(73) Assignee: BESTGRAPHENE CO., LTD, Yeoju-si (KR)

( * ) Notice: Subject to any disclaimer, the term of this patent is extended or adjusted under 35 U.S.C. 154(b) by 301 days.

(21) Appl. No.: 17/974,557

(22) Filed: Oct. 27, 2022

(65) Prior Publication Data

US 2023/0096199 A1 Mar. 30, 2023

Related U.S. Application Data

(62) Division of application No. 16/708,467, filed on Dec. 10, 2019, now Pat. No. 11,515,055.

(30) Foreign Application Priority Data

Dec. 19, 2018 (KR) .................. 10-2018-0165523
Jun. 5, 2019 (KR) .................. 10-2019-0066480

(51) Int. Cl.
| | |
|---|---|
| C25D 15/00 | (2006.01) |
| C01B 32/19 | (2017.01) |
| C01B 32/194 | (2017.01) |
| C01B 32/198 | (2017.01) |
| C01B 32/225 | (2017.01) |
| C09D 11/03 | (2014.01) |

(Continued)

(52) U.S. Cl.
CPC .............. *C25D 15/00* (2013.01); *C01B 32/19* (2017.08); *C01B 32/194* (2017.08); *C01B 32/198* (2017.08); *C01B 32/225* (2017.08); *C09D 11/03* (2013.01); *G21F 1/125* (2013.01); *G21F 3/00* (2013.01)

(58) Field of Classification Search
None
See application file for complete search history.

(56) References Cited

U.S. PATENT DOCUMENTS

2014/0034899 A1 2/2014 Ahn et al.
2014/0374267 A1* 12/2014 Monteiro ............ C25D 9/04
205/104

(Continued)

FOREIGN PATENT DOCUMENTS

CN 103436938 A * 12/2013
WO 2018-101887 A1 6/2018

OTHER PUBLICATIONS

Valles "Solutions of Negatively Charged Graphene Sheets and Ribbons." JACS, 130, 15802-4 (Year: 2008).

*Primary Examiner* — Louis J Rufo
(74) *Attorney, Agent, or Firm* — Revolution IP, PLLC

(57) ABSTRACT

A composite sheet for shielding electromagnetic and radiating heat includes: a first layer formed of metal; and a second layer that is a graphene layer formed on one surface of the first layer and including charged chemically modified graphene such that thermal conductivity and electromagnetic shielding ability are improved while securing economic efficiency by using the second layer including the charged chemically modified graphene and the graphene flakes.

7 Claims, 6 Drawing Sheets

(51) Int. Cl.
 G21F 1/12 (2006.01)
 G21F 3/00 (2006.01)

(56) References Cited

U.S. PATENT DOCUMENTS

| | | |
|---|---|---|
| 2015/0200403 A1 | 7/2015 | Sundara et al. |
| 2016/0380255 A1* | 12/2016 | Daughenbaugh ............ H01M 10/0525 429/213 |
| 2019/0143367 A1 | 5/2019 | Lin et al. |

* cited by examiner

COMPOSITE SHEET FOR SHIELDING ELECTROMAGNETIC AND RADIATING HEAT INCLUDING GRAPHENE SHEET

CROSS-REFERENCE TO RELATED APPLICATION

This application is a Division of U.S. patent application Ser. No. 16/708,467 filed on Dec. 10, 2019, which claims priority to and the benefit of Korean Patent Application Nos. 10-2018-0165523 filed in the Korean Intellectual Property Office on Dec. 19, 2018, and 10-2019-0066480 filed in the Korean Intellectual Property Office on Jun. 5, 2019, the entire contents of which are incorporated herein by reference.

BACKGROUND OF THE INVENTION

1. Field of the Invention

The present invention relates to a composite sheet for shielding electromagnetic and radiating heat including a graphene sheet.

2. Description of the Related Art

In recent years, an electronic device has been pursued to be lighter, thinner, smaller, and more versatile than that of the past. However, the high integration of an electronic element to achieve this generates high heat, and furthermore, electromagnetic waves generated from the electronic element interfere with a normal operation of other electronic elements.

Emission heat or electromagnetic waves generated in the electronic element deteriorates a function of the electronic element, and also cause problems such as malfunction of other elements and substrate degradation.

In order to solve the programs of the heat generation and the electromagnetic wave of the electronic element, a heat radiating material or an electromagnetic wave shielding material is used. In the related art, a metal plate such as copper or aluminum is used as the heat radiating material or the electromagnetic wave shielding material. However, such a metal plate has problems such as workability and weight reduction, and in recent years, a composite material, in which a filler for shielding electromagnetic and radiating heat is dispersed in a polymer resin, is preferred.

The composite material for shielding electromagnetic and radiating heat can compensate for the low thermal conductivity and low shielding property that are disadvantages of the polymer material through the filler while maintaining easy workability, low cost, light weight, variety of shapes, and the like that are advantages of the polymer material. As a representative example of the composite material for shielding electromagnetic and radiating heat, there is a composite sheet that forms a new layer with the composite material for shielding electromagnetic and radiating heat while reducing a thickness of the metal plate.

However, when an amount of the polymer resin is increased, such a composite material is improved in the workability and the like, but the thermal conductivity or shielding property is lowered. On the other hand, when the amount of the polymer resin is decreased, the thermal conductivity or shielding property is improved, but the workability is lowered. As a result, they are in a trade-off relationship with each other.

In order to solve the trade-off problem, there is an attempt to use graphite but graphite has disadvantages such as high price, difficulty in mass production, and lack of flexibility. Furthermore, a separate thermal conductive adhesive layer is required to attach graphite on the metal layer.

As a result, a new composite material for shielding electromagnetic and radiating heat is required in which both the thermal conductivity and the shielding property are increased and which has sufficient economic efficiency while having the advantages of the polymer material.

SUMMARY OF THE INVENTION

The present invention is provided to solve the problems described above and one object of the present invention is to provide a new composite sheet for shielding electromagnetic and radiating heat, in which both thermal conductivity and shielding property are increased while having advantages of a polymer material.

On the other hand, other unspecified objects of the present invention will be further considered within a range that can be easily inferred from the following detailed description and effects.

According to one example of the present invention to achieve the one object described above, there is provided a composite sheet for shielding electromagnetic and radiating heat including: a first layer formed of metal; and a second layer that is a graphene layer formed on one surface of the first layer and including charged chemically modified graphene.

In one example, the graphene layer may further include graphene flake.

Preferably, an absolute value of a zeta potential of the charged chemically modified graphene may be 25 mV or more.

Preferably, element contents of the charged chemically modified graphene may be 76 to 85 atomic % carbon, 5 to 25 atomic % oxygen, and 2 to 20 atomic % nitrogen, and $|O-N|>3$.

Preferably, element contents of the graphene flake may be 90 to 99.4 atomic % carbon, 0.5 to 5 atomic % oxygen, and 0.1 to 5 atomic % nitrogen.

Preferably, a weight ratio between the charged chemically modified graphene and the graphene flake may be 1:399 to 1:1,999.

In one example, the first layer and the second layer may be alternately formed.

In one example, the second layer may have a thickness of 0.05 to 3 μm.

In one example, the first layer may be formed of any one selected from a group consisting of Cu, Al, Ta, Ni, Co, Fe, Pt, Au, Cr, Mg, Mn, Mo, Rh, Ru, Si, Ta, Ti, W, U, V, Zr, brass, bronze, cupronickel, stainless steel, and Ge, or alloys thereof.

According to another example of the present invention to achieve the one object described above, there is provided a method for producing a composite sheet for shielding electromagnetic and radiating heat, the method including: a step of preparing a graphene ink composition including a first layer formed of metal and a chemically modified graphene; a step of immersing the first layer and a counter electrode in the graphene ink composition contained in a first reactor by electrically connecting the first layer to a cathode, and connecting the counter electrode to an anode; and a step of forming a second layer, which is a graphene layer, on a surface of the first layer by applying power to the cathode and the anode.

In another example, the graphene ink composition may further include graphene flake.

Preferably, the step of preparing the graphene ink composition may include: a step of preparing a first colloid in which the charged chemically modified graphene is dispersed; a step of preparing a second colloid in which the graphene flake is dispersed; and a step of producing a graphene ink composition by mixing the first colloid, the second colloid, a binder, and a solvent.

Preferably, the step of preparing the first colloid may include: a step of preparing expanded graphite oxide by treating the graphite flake with an oxidizing agent and irradiating the graphite flake with microwaves after deposition treatment; a step of preparing graphene oxide by exfoliating the expanded graphite oxide; a step of preparing a graphene oxide suspension by mixing the prepared graphene oxide with deionized water; and a step of producing the first colloid including the charged chemically modified graphene through a large-capacity circulating ultrasonic dispersion system after adding and stirring an additive for modifying graphene in the graphene oxide suspension.

Preferably, the additive may be any one of an organic single molecule or a polymer having an amine group, a hydroxy group, or an azide group. Preferably, the step of preparing the second colloid may include: a step of preparing expanded graphite; a step of preparing the graphene flake by exfoliating the expanded graphite; and a step of producing the second colloid by dispersing the exfoliated graphene flake.

In another example, after executing the step of forming the second layer, the method may further include: a step of immersing the composite sheet and a counter electrode by electrically connecting the composite sheet on which the second layer is formed to the cathode, and connecting the counter electrode to the anode; and a step of forming the first layer on a surface of the second layer by applying power to the cathode and the anode.

In another example, the method may further include: a step of improving a bonding force between the first layer and the second layer by heat-treating the composite sheet on which the second layer is formed at 300 to 1,200° C.

According to further another example of the present invention to achieve the one object described above, there is provided a method for producing a composite sheet for shielding electromagnetic and radiating heat including: a step of preparing a graphene ink composition including a first layer formed of metal, chemically modified graphene, and graphene flake; and a step of forming a second layer, which is a graphene layer including chemically modified graphene and graphene flake, on a surface of the first layer by a sol-gel method by immersing the first layer in the graphene ink composition.

The composite sheet for shielding electromagnetic and radiating heat according to one example of the present invention includes the first layer formed of metal, and the second layer formed on one surface of the first layer and including the charged chemically modified graphene and the graphene flake. Therefore, the thermal conductivity and the shielding property are remarkably improved.

In particular, the graphene flake has a problem of dispersibility, and in the composite sheet for shielding electromagnetic and radiating heat according to one example of the present invention, the problem of dispersibility of the graphene flake is solved by using that an absolute value of the zeta potential of the charged chemically modified graphene is 25 mV or more, thereby achieving economic efficiency and high performance, at the same time.

On the other hand, even if effects are not explicitly mentioned herein, the effects described in the following specification and the provisional effects expected by the technical features of the present invention are treated as those described in the specification of the present invention.

The accompanying drawings are illustrated as a reference for understanding the technical idea of the present invention, and by which the scope of the present invention is not limited.

DETAILED DESCRIPTION OF THE EMBODIMENT

In the following description of the present invention, when it is determined that the subject matter of the present invention may be unnecessarily obscured by those skilled in the art with respect to the known functions related thereto, detailed description thereof will be omitted.

Method for Producing Graphene Ink Composition

Figure 1:
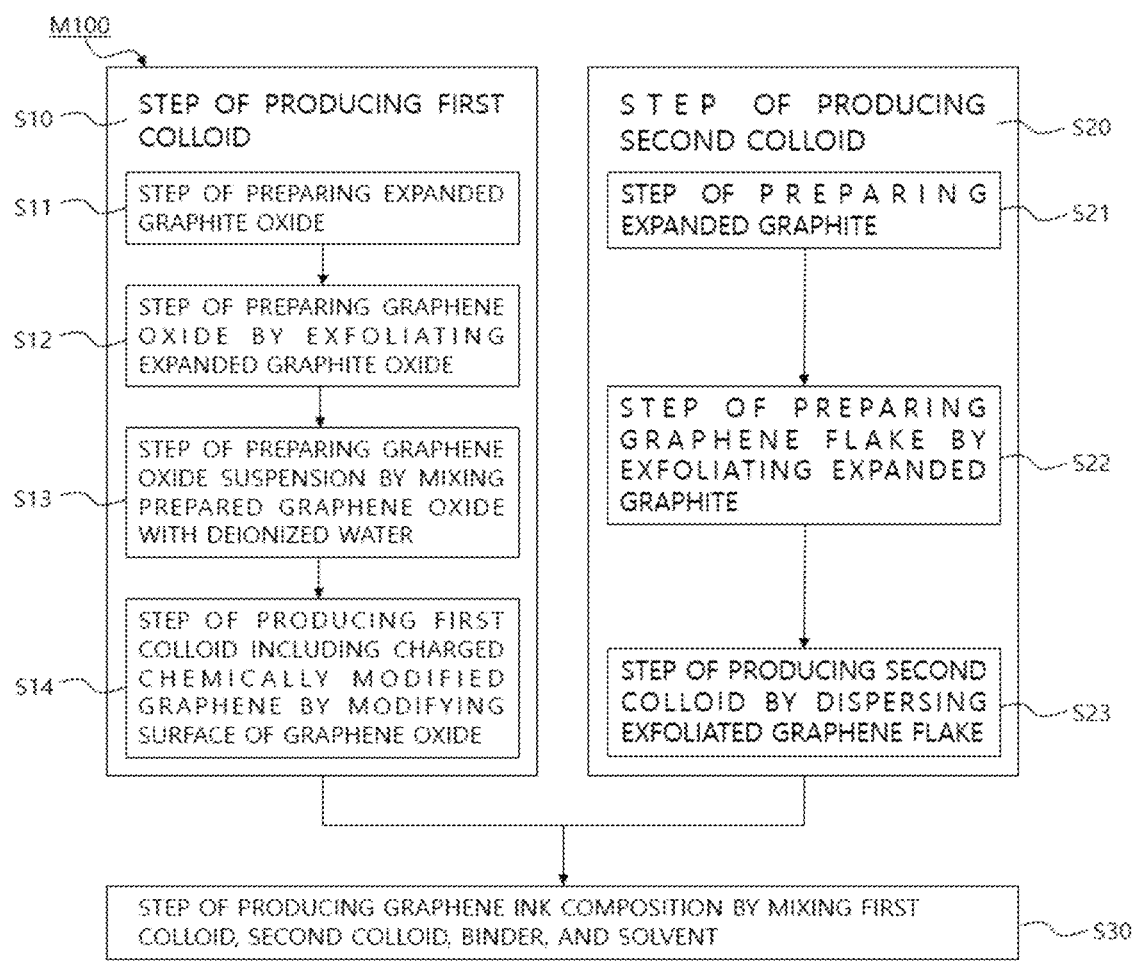
FIG. 1 is a schematic flowchart of a method for producing a graphene ink composition according to one example of the present invention.

FIG. 1 is a schematic flowchart of a method for producing a graphene ink composition according to one example of the present invention. Referring to FIG. 1, the method M100 for producing the graphene ink composition according to one example of the present invention will be described.

First, step S10 of preparing a first colloid in which charged chemically modified graphene is dispersed is performed.

Considering step S10 of preparing the first colloid in detail, step S10 includes step S11 of preparing expanded graphite oxide by treating the graphite flake with an oxidizing agent and irradiating the graphite flake with microwaves after deposition treatment; step S12 of preparing graphene oxide by exfoliating the expanded graphite oxide; step S13 of preparing a graphene oxide suspension by mixing the prepared graphene oxide with deionized water; and step S14 of producing a first colloid including the charged chemically modified graphene through a large-capacity circulating ultrasonic dispersion system after adding and stirring an additive for modifying graphene in the graphene oxide suspension.

Step S11 of preparing the expanded graphite oxide may be performed by irradiating the graphite flake with the microwave for 1 to 10 minutes at an output of 500 to 1,000 W after the graphite flake is deposited for substantially 30 minutes in the oxidizing agent. In this case, as the oxidizing agent, it is possible to use a complex oxidizing agent mixed with two or more of potassium permanganate, sulfuric acid, hydrogen peroxide, or phosphoric acid. The graphite flake having an average diameter of 100 to 500 μm may be used. The graphite oxide obtained in such a method is called microwaved expanded graphite oxide (MEGO).

Next, step S12 of preparing the graphene oxide by exfoliating the expanded graphite oxide is performed. Step S12 of preparing the graphene oxide by exfoliating the expanded graphite oxide may be performed by a chemical exfoliation method, for example, and an improved method, which is well known among chemical exfoliation methods, using phosphoric acid, sulfuric acid, and potassium permanganate may be used.

Next, step S13 of preparing the graphene oxide suspension by mixing the prepared graphene oxide with deionized water. That is, the exfoliated graphene oxide is dispersed in deionized water (DI water) to produce the graphene oxide suspension. At this time, the graphene oxide suspension is composed of 0.05 to 1 wt % of the graphene oxide and the balance of deionized water.

After producing the graphene oxide suspension, step S14 of producing the first colloid including the charged chemically modified graphene through the large-capacity circulating ultrasonic dispersion system after adding and stirring the additive for modifying the graphene in the graphene oxide suspension is performed.

Specifically, 50 to 150 parts by weight of the additive is added to 100 parts by weight of the graphene oxide suspension and stirred at 90 to 120° C. for 12 to 36 hours to modify a surface of the graphene oxide.

In this case, as the additive, it is possible to use an organic monomolecule or polymer weight having an amine group, a hydroxy group, and an azide group to modify the graphene. As the organic monomolecule or the polymer having the amine group, it is possible to use any one selected from a group consisting of ethylenediamine, triethylamine, para-phenylenediamine, 3,3',4,4'-tetraaminobiphenyl, 3,3',4,4'-tetraaminoterphenyl, benzidine, 1,5-diaminonaphthalene, (E)-4,4'-(diazene-1,2-diyl) dianiline ((E)-4,4'-(diazene-1,2-diyl) dianiline), ethylenediamine, 1,6-diaminohexane, and 1,8-diaminooctane. As the organic monomolecule or the polymer having the hydroxy group, it is possible to use any one selected from a group consisting of poly (vinyl alcohol) (PVA), hot strong alkaline solutions (KOH, NaOH), hydroxyl-amine, and the like. As the organic monomolecule or the polymer having the azide group, it is possible to use any one selected from a group consisting of 2-azidoethanol, 3-azidopropan-1-amine, 4-(2-azidoethoxy)-4-oxobutanoic acid, 2-azidoethyl-2-bromo methylpropanoate, chlorocarbonate, azidocarbonate, dichlorocarbene, carbene, erin, and nitrene.

A surface modification reaction is finished, the first colloid containing 1 ton of the charged chemically modified graphene is produced through the large-capacity circulating ultrasonic dispersion system. At this time, the charged chemically modified graphene may be dispersed in a solvent.

As the solvent, it is possible to use any one of water, acetone, methyl ethyl ketone, methyl alcohol, ethyl alcohol, isopropyl alcohol, butyl alcohol, ethylene glycol, ethylene glycol, polyethylene glycol, tetrahydrofuran, dimethylformamide, dimethylacetamide, N-methyl-2-pyrrolidone, hexane, cyclohexanone, toluene, chloroform, distilled water, dichlorobenzene, dimethylbenzene, trimethylbenzene, pyridine, methylnaphthalene, nitromethane, acrylonitrile, octadecylamine, aniline, dimethyl sulfoxide, methylene chloride, diehthylene glycol methyl ethyl ether, and ethyl acetate. As a mixed solvent, it is possible to use any one of carbon nanoplate complex, co-solvent, amide-based N,N-dimethylformamide (DMF), N-methylpyrrolidone (NMP), ammonium hydroxide hydrochloric acid solution, alpha-tepinol, chloroform, methyl ethyl ketone, formic acid, nitroethane BBB, 2-ethoxyethanol, 2-methoxy ethanol, 2-butoxy ethanol, 2-methoxy propanol, ethylene glycol, acetone, methyl alcohol, ethyl alcohol, isof BBB lofil alcohol, butyl alcohol, ethylene glycol, polyethylene glycol, tetrahydrofuran, dimethylformamide, dimethylacetamide, N-methyl-2-pyrrolidone, hexane, cyclohexanone, toluene, chloroform, distilled water, dichlorobenzene, dimethylbenzene, trimethyl benzene, pyridine, methylnaphthalene, nitromethane, acrylonitrile, octadecylamine, aniline, dimethylsulfoxide, methylenechlor, 2-methoxy ethanol, gamma-butyrolactone (γ-GBL), benzyl benzoate, 1-methyl-2-pyrrolidinone (NMP), N,Ndimethylacetamide (DMA), 1,3-dimethyl-2-imidazolidinone (DMEU), 1-vinyl-2-pyrrolidone (NVP), 1-dodecyl-2-pyrrolidinone (N12P), N,N-dimethylformamide (DMF), dimethyl sulfoxide (DMSO), isopropoanol (IPA), and 1-octyl-2-pyrrolidone (N8P)).

The charged chemically modified graphene produced in such a method may have a negative charge (N type) or a positive charge (P type) according to a type and a content of the additive. The N type satisfies O/N>1 and the P type satisfies O/N<1. In addition, the charged chemically modified graphene has a lateral size of 50 to 50,000 nm and an average thickness of 2 nm or less.

The following Table 1 illustrates the charged chemically modified graphene of the first colloid in which dispersibility and a sheet resistance are measured according to the atomic ratio of carbon, oxygen, and nitrogen. The sheet resistance is measured by producing a graphene sheet having a thickness of 500 nm by using the first colloid. On the other hand, the sheet resistance and electromagnetic wave shielding characteristics are generally closely related. That is, when the sheet resistance increases, the electromagnetic wave shielding characteristics decrease in proportion thereto.

TABLE 1

| Sample | Type | C | O | N | |O-N| | Zeta potential | Sheet Resistance (Ω/sq) |
|---|---|---|---|---|---|---|---|
| a1 | GO | 62 | 48 | 0 | 48 | −48 | >10$^{12}$ |
| a2 | CMG-N | 75 | 22 | 3 | 19 | −35 | 1.9 × 10$^5$ |
| a3 | CMG-N | 78 | 18 | 4 | 14 | −27 | 1.4 × 10$^4$ |
| a4 | CMG-N | 81 | 11 | 8 | 3 | −12 | 1.1 × 10$^4$ |
| a5 | CMG-P | 80 | 8 | 12 | 4 | +28 | 1.2 × 10$^4$ |
| a6 | CMG-P | 79 | 7 | 14 | 7 | +31 | 1.2 × 10$^4$ |
| a7 | CMG-P | 83 | 8 | 9 | 1 | +11 | 0.9 × 10$^3$ |

*GO: Graphene oxide, *CMG: Charged chemically modified graphene

Referring to Table 1, it can be seen that the charged chemically modified graphene has a high zeta potential and low sheet resistance compared to those of the graphene oxide. However, in general, when an absolute value of the zeta potential is 25 mV or more, the dispersibility is good, so that it is preferable that |O—N|>3.

In particular, when the carbon content of the charged chemically modified graphene is 75% or less, the sheet resistance is high as substantially $10^5$ Ω/sq, but when the carbon content exceeds 75%, the sheet resistance is lowered to a level of $10^4$ Ω/sq or less. Therefore, the element contents of the charged modified graphene are preferably 76 to 85 atomic % carbon, 5 to 25 atomic % oxygen, and 2 to 20 atomic % nitrogen.

Step S20 of preparing the second colloid is performed together with or separately from step S10 of preparing the first colloid.

Step S20 of preparing the second colloid includes step S21 of preparing the expanded graphite, step S22 of preparing the graphene flake by exfoliating the expanded graphite, and step S23 of producing the second colloid by dispersing the exfoliated graphene flake.

Step S21 of preparing the expanded graphite may be performed by irradiating the graphite flake with microwaves for 1 to 10 minutes at an output of 500 to 1,000 W after the graphite flake is deposited in the oxidizing agent for substantially 30 minutes. In this case, as the oxidant, it is possible to use a complex oxidant in which two or more of potassium permanganate, sulfuric acid, hydrogen peroxide, or phosphoric acid is mixed. The expanded graphite flake which is produced as described above has an average diameter of 100 μm or less. On the other hand, in step S21 of preparing the expanded graphite, it is also possible to purchase and use expanded graphite having an average diameter of 100 μm or less.

Next, step S22 of preparing the graphene flake by exfoliating the expanded graphite oxide is performed. In step S22 of preparing the graphene flake by exfoliating the expanded graphite, a liquid-phase exfoliation method can be used.

Next, step S23 of producing the second colloid by dispersing the exfoliated graphene flake is performed.

That is, the exfoliated graphene flake is dried and then dispersed in a solvent. The solvent can use the same as the solvent of the first colloid.

On the other hand, as illustrated in Table 1, unlike the charged chemically modified graphene, the graphene flake does not have an electrostatic repulsive force, so the graphene flake is poor in dispersibility in a polar solvent. Therefore, in order to improve the dispersibility of the graphene flake, the second colloid may further include 1 to 50 wt % of a dispersion aid in relation to the content of the graphene.

As the dispersion aid, it is possible to use a silane compound that hydrolyzes to cause a condensation reaction. As the silane compound hydrolyzing to cause the condensation reaction, it is possible to use any one selected from a group consisting of tetramethoxysilane, tetraethoxysilane, tetra-n-propoxysilane, tetra-i-propoxysilane, and tetra-n-butoxysilane, and tetraalkoxysilanes consisting of mixtures thereof, methyltrimethoxysilane, methyltriethoxysilane, ethyltrimethoxysilane, ethyltriethoxysilane, n-propyltrimethoxysilane, n-propyltriethoxysilane, i-propyltrimethmethoxysilane, i-propyltriethoxysilane, n-butyltrimethoxysilane, n-butyltriethoxysilane, n-pentyltrimethoxysilane, n-hexyltrimethoxysilane, n-heptyltrimethoxysilane, n-octyltrimethoxysilane, vinyltrimethoxysilane, vinyltriethoxysilane, cyclohexyltrimethoxysilane, cyclohexyltriethoxysilane, phenyltrimethoxysilane, phenyltriethoxysilane, 3-chloro propyltrimethoxysilane, 3-chloropropyltriethoxysilane, 3,3,3-trifluoropropyltrimethoxysilane, 3,3,3-trifluoropropyltriethoxysilane, 3-aminopropyltrimethoxysilane, 3-aminopropyltriethoxysilane, 2-hydroxyethyltrimethoxysilane, 2-hydroxyethyltriethoxysilane, 2-hydroxypropyltrimethoxysilane, 2-hydroxypropyltriethoxysilane, 3-hydroxypropyltrimethoxysilane, 3-hydroxypropyltriethoxysilane, 3-mercaptopropyltrimethoxy silane, 3-mercaptopropyltriethoxysilane, 3-isocyanatepropyltrimethoxysilane, 3-isocyanatepropyltriethoxysilane, '33-glycidoxypropyltrimethoxy silane, 3-glycidoxypropyltriethoxysilane, 2-(3,4-epoxycyclohexyl) ethyltrimethoxysilane, 2-(3,4-epoxycyclohexyl) ethyltriethoxysilane, 3-(meth) acryloxypropyltrimethoxysilane, 3-(meth) acryloxypropyltriethoxysilane, and 3-ureidopropyltrimethoxysilane, and trialkoxysilane consisting of mixtures thereof; dimethyldimethoxy silane, dimethyldiethoxy silane, diethyl dimethoxy silane, diethyldiethoxysilane, di-n-propyldimethoxysilane, di-n-propyldiethoxysilane, di-i-propyldimethoxysilane, di-i-propyldiethoxysilane, di-n-butyldimethoxysilane, di-n-butyldiethoxysilane, di-n-pentyldimethoxysilane, di-n-pentyldiethoxysilane, di-n-hexyldimethoxysilane, di-n-hexyl diethoxysilane, di-n-heptyldimethoxysilane, di-n-heptyl diethoxy silane, di-n-octyldimethoxy silane, di-n-octyldiethoxysilane, di-n-cyclohexyldimethoxysilane, di-n-cyclohexyldiethoxy, and diphenyldimethoxysilane, diphenyldiethoxysilane, and dialkoxysilanes consisting of mixtures thereof.

The graphene flake of the second colloid has a lateral size of 0.3 to 50 μm and an average thickness of 2 to 20 nm. In addition, the element contents of the graphene flake may be 90 to 99.4 atomic % carbon, 0.5 to 5 atomic % oxygen, and 0.1 to 5 atomic % nitrogen.

Next, step S30 of producing the graphene ink composition by mixing the first colloid, the second colloid, the binder, and the solvent is performed.

In the first colloid, the absolute value of the zeta potential of the charged chemically modified graphene is 25 mV or more. As described above, this is because the use of charged chemically modified graphene having the absolute value of the zeta potential of 25 mV or more requires that the charged chemically modified graphene is uniformly dispersed and mixed with the graphene oxide when the first colloid and the second colloid are mixed, so that the performance improvement of the graphene ink composition can be expected.

The binder may use at least one selected from a group consisting of thermosetting resin, thermoplastic resin, photocurable resin, and conductive polymer. As the thermosetting resin, it is possible to use urethane resin, epoxy resin, melamine resin, polyimide, and mixtures thereof. As the thermoplastic resin, it is possible to use polystyrene and derivatives thereof, polystyrene butadiene copolymer, polycarbonate, polyvinyl chloride, polysulfone, polyethersulfone, polyetherimide, polyacrylate, polyester, polyimide, polyamic acid, cellulose acetate, polyamide, polyolefin, polymethyl methacrylate, polyether ketone, polyoxyethylene, mixtures thereof, and the like. Photocurable resin is epoxy resins, polyethylene oxide, urethane resin, and mixtures thereof, and reactive oligomer is epoxy acrylate, polyester acrylate, urethane acrylate, polyether acrylate, thiolate, organosilicon polymer, organic silicone copolymer, and mixtures thereof, and reactive monomer is 2-ethylhexyl acrylate, oltyldecyl acrylate, isodecyl acrylate, dredyl methacrylate, 2-phenoxyethyl acrylate, nonylphenol ethoxylake monoacrylate, ethoxyethyl acrylate, hydroxyethyl acrylate, hydroxyethyl methacrylate, hydroxypropyl acrylate, hydroxypropyl methacrylate, hydroxybutyl acrylate, hydroxybutyl methacrylate, and the like, as monofunctional monomer. In addition, the reactive monomer is 1,3-butanediol diacrylate, 1,4-butanediol diacrylate, 1,6-hexanediol diacrylate, diethylene glycol diacrylate, driethylene glycol dimethacryl, neopentyl glycol diacrylate, ethylene glycol dimethacrylate, tetraethylene glycol methacrylate, polyethylene glycol dimethacrylate, tripropylene glycol diacrylate, 1,6-hexanediol diacrylate, and mixtures thereof, as bifunctional monomer. On the other hand, reactive monomer is trimethylolpropanedriacrylate, trimethylolpropanetrimethacrylate, pentaerythritoltriacrylate, glycidylpentatriacrylate, glycidylpentatriacrylate, and mixtures thereof, as trifunctional monomer. Benzophenone series, benzyl dimethyl ketal series, acetophenone series, anthraquinone series, thixosoxanthone series, and mixtures thereof may be added to the photocurable resin as a photoinitiator. As the conductive polymer, it is possible to use polythiophene homopolymer, polythiophene copolymer, polyacetylene, polyaniline, polypyrrole, poly (3,4-ethylenedioxythiophene), pentacene compound, and mixtures thereof. The binder may be included in an amount of 1 to 60 wt % based on the entire graphene ink composition, and the usage of the graphene ink composition may vary depending on the content of the binder.

The solvent may be the same as that used in the production of the first colloid and the second colloid, and the content of the solvent may be included in an amount of 10 to 98.9 wt % based on the entire graphene ink composition.

On the other hand, a composition ratio of step S30 of producing the graphene ink composition by mixing the first colloid, the second colloid, the binder, and the solvent is determined by the contents of the charged chemically modified graphene and the graphene flake. In this case, the charged chemically modified graphene and the graphene flake may be included in an amount of 0.01 to 30 wt % based on the entire graphene ink composition.

Figure 2:
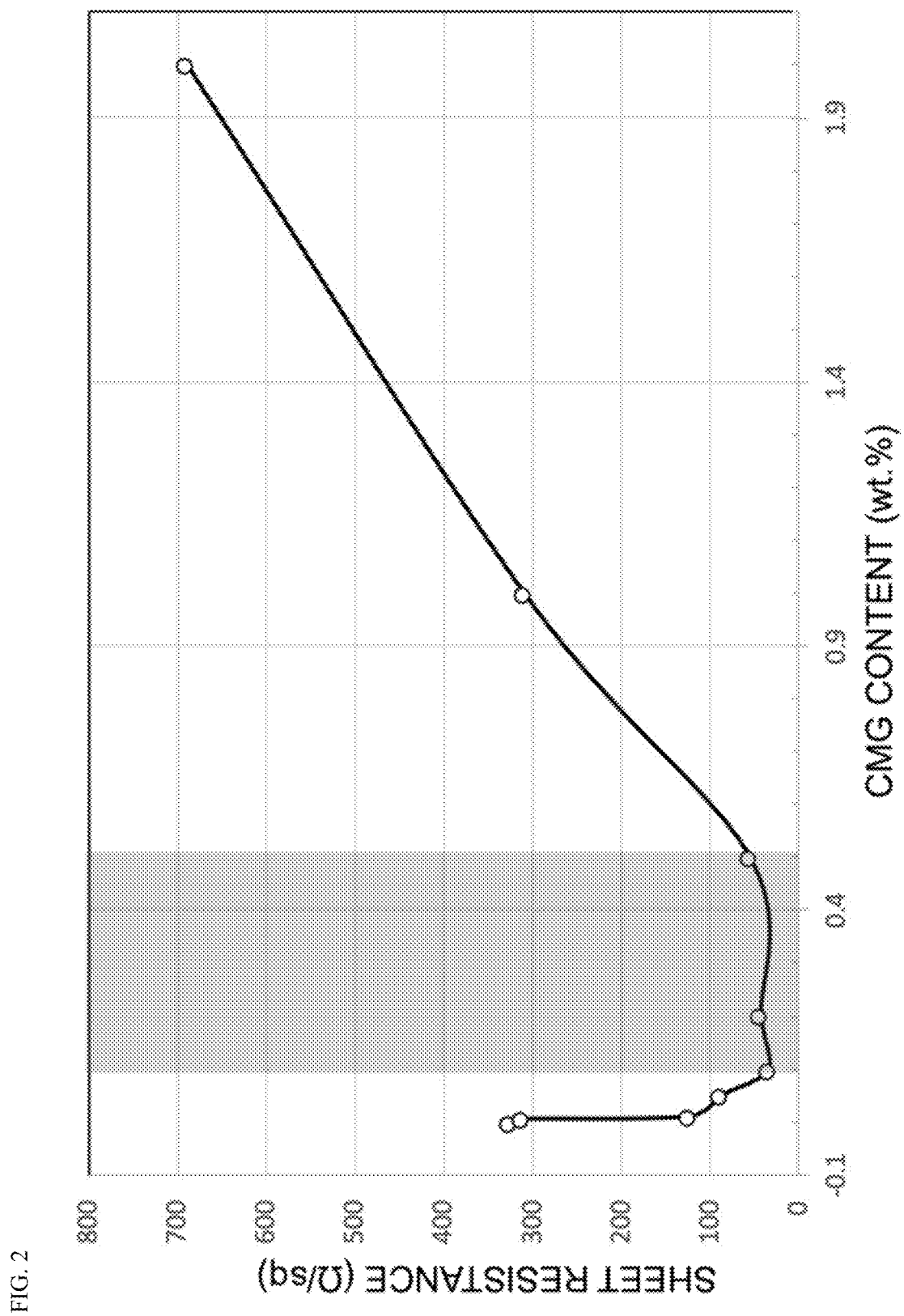
FIG. 2 is a graph for explaining a measurement of a sheet resistance according to a content of charged chemically modified graphene of the graphene ink composition according to one example of the present invention.

Table 2 and FIG. 2 illustrate graphene ink composition in which the sheet resistance is measured according to the composition of graphene ink composition that can be used for an electrode. The balance in the composition of the graphene ink composition is a solvent.

TABLE 2

| Sample | Content of Graphene (wt %) | | Content of Binder (wt %) | Sheet Resistance (Ω/sq) |
| --- | --- | --- | --- | --- |
| | CMG | GF | | |
| b1 | 0 | 20 | 10 | 326 |
| b2 | 0.005 | 19.995 | 10 | 311 |
| b3 | 0.01 | 19.99 | 10 | 125 |
| b4 | 0.05 | 19.95 | 10 | 88 |
| b5 | 0.1 | 19.9 | 10 | 35 |
| b6 | 0.2 | 19.8 | 10 | 43 |
| b7 | 0.5 | 19.5 | 10 | 56 |
| b8 | 1.0 | 19.0 | 10 | 310 |
| b9 | 2.0 | 18.0 | 10 | 689 |

*CMG: Charged chemically modified graphene,
*GF: Graphene flake

Referring to Table 2 and FIG. 2, it can be seen that the sheet resistance is significantly reduced to 125 Ω/sq or less when 0.01 to 0.5 wt % of the charged chemically modified graphene is included. It is determined that this is because the charged chemically modified graphene activates an electrical path in the graphene ink composition in a state of being evenly dispersed in the graphene ink composition. However, when the charged chemically modified graphene is mixed in excess of the graphene flake, low sheet resistivity of the charged modified graphene mainly acts to lower the sheet resistance of the graphene ink composition.

That is, the sheet resistance of the graphene ink composition is greatly influenced by relative amounts of the chemically modified graphene and the graphene flake. Therefore, in order to significantly reduce the sheet resistance of the graphene ink composition, the graphene ink according to one example of the present invention can bring a weight ratio of charged chemically modified graphene to the graphene flake from 1:199 to 1:1,999.

Figure 3:
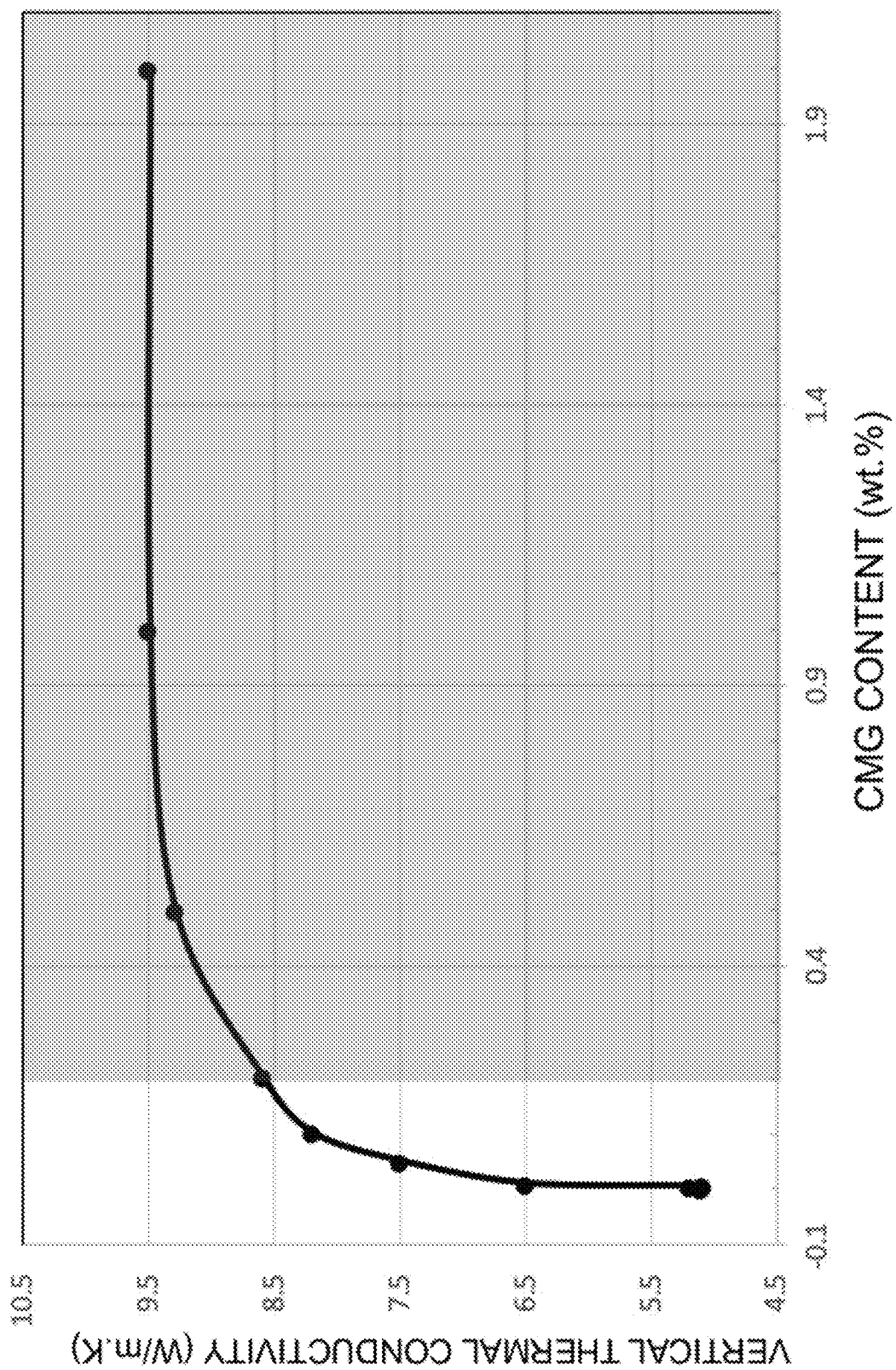
FIG. 3 is a graph for explaining a measurement of a vertical thermal conductivity according to the content of the charged chemically modified graphene of the graphene ink composition according to one example of the present invention.

Table 3 and FIG. 3 illustrate the graphene ink composition that can be used for heat radiation adhesive (TIM) in which the sheet resistance is measured according to the graphene ink composition. The balance in the composition of the graphene ink composition is a solvent.

TABLE 3

| Sample | Content of Graphene (wt %) | | Content of Binder (wt %) | Vertical Thermal Conductivity (W/m · K) |
| --- | --- | --- | --- | --- |
| | CMG | GF | | |
| b1 | 0 | 20 | 40 | 5.1 |
| b2 | 0.005 | 19.995 | 40 | 5.2 |
| b3 | 0.01 | 19.99 | 40 | 6.5 |
| b4 | 0.05 | 19.95 | 40 | 7.5 |
| b5 | 0.1 | 19.9 | 40 | 8.2 |
| b6 | 0.2 | 19.8 | 40 | 8.6 |
| b7 | 0.5 | 19.5 | 40 | 9.3 |
| b8 | 1.0 | 19.0 | 40 | 9.5 |
| b9 | 2.0 | 18.0 | 40 | 9.5 |

*CMG: Charged chemically modified graphene,
*GF: Graphene flake

Referring to Table 3 and FIG. 3, it can be seen that when the charged chemically modified graphene is included in 0.05 wt % or more, a vertical thermal conductivity is improved to 7.5 W/m·K or more. It is determined that this is because the charged chemically modified graphene activates the heat conduction path in the graphene ink composition in a state of being evenly dispersed in the graphene ink composition. However, when the charged chemically modified graphene is sufficiently mixed at 1 wt % or more to sufficiently activate the thermal conduction path, a saturation tendency of thermal conductivity appears. However, in order to have the above-described sheet resistance reduction effect at the same time, the content of the charged chemically modified graphene may be included in 0.05 to 0.1 wt %.

On the other hand, a vertical thermal conductivity of the graphene ink composition is greatly influenced by relative amounts of the chemically modified graphene and the graphene flake. Therefore, in order to significantly reduce the sheet resistance of the graphene ink composition and at the same time improve the vertical thermal conductivity, the graphene ink composition according to one example of the present invention may have a weight ratio of the charged chemically modified graphene and the graphene flake to be 1:399 to 1:1,999.

Next, a method for producing the composite sheet for shielding electromagnetic and radiating heat using the graphene ink composition prepared by the method described above will be described.

Figure 4:
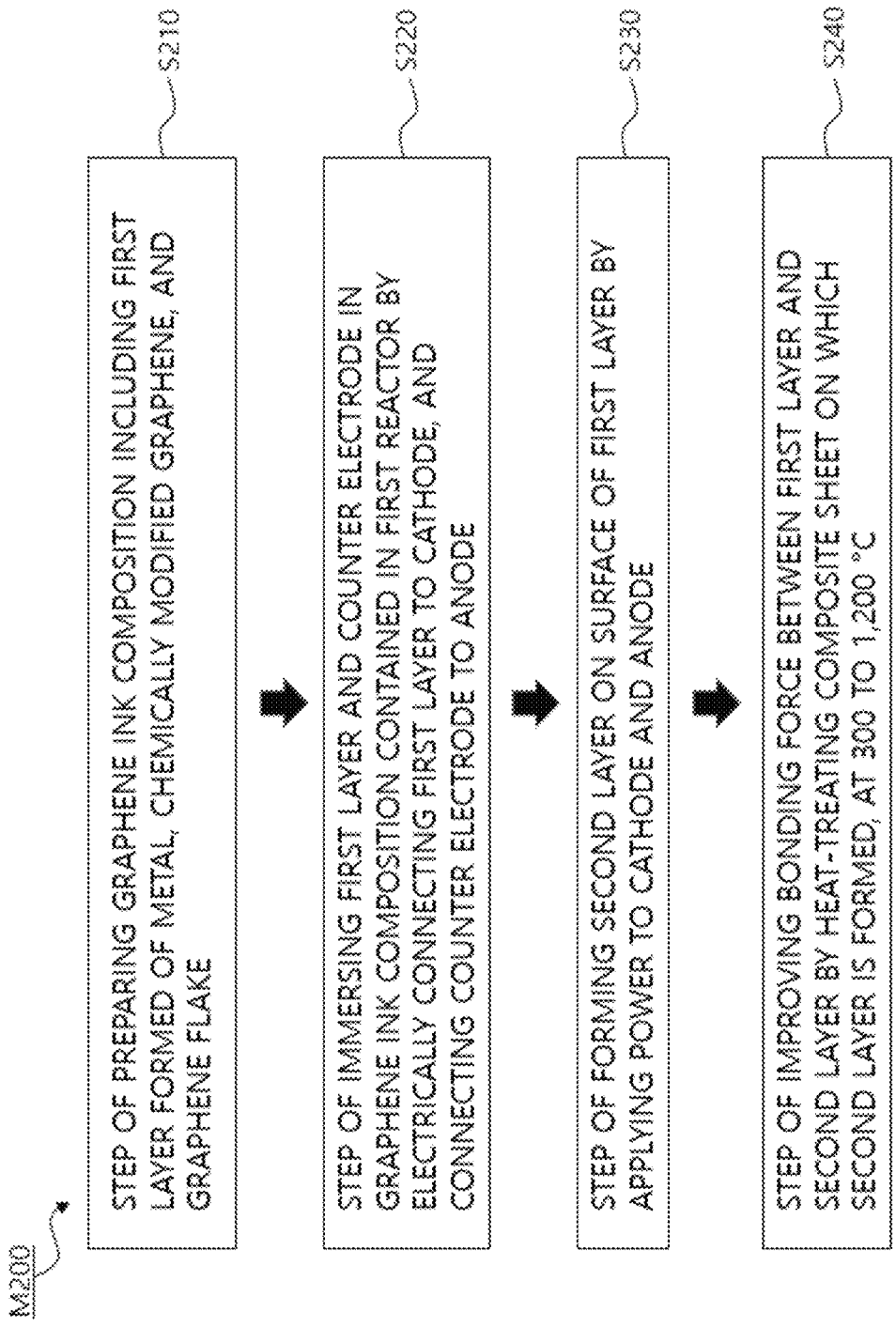
FIG. 4 is a schematic flowchart for explaining a method for producing a composite sheet for shielding electromagnetic and radiating heat according to another example of the present invention.

Method for Producing Composite Sheet for Shielding Electromagnetic and Radiating Heat FIG. 4 is a schematic flowchart of a method M200 for producing the composite sheet for shielding electromagnetic and radiating heat according to another example of the present invention.

Referring to FIG. 4, the method M200 for producing the composite sheet for shielding electromagnetic and radiating heat according to another example of the present invention includes step S210 of preparing a graphene ink composition including a first layer formed of metal and chemically modified graphene, step S220 of immersing the first layer and a counter electrode in the graphene ink composition contained in a first reactor by electrically connecting the first layer to a cathode, and connecting the counter electrode to an anode, and step S230 of forming a second layer on a surface of the first layer by applying power to the cathode and the anode. Furthermore, the method may further include step S240 of improving a bonding force between the first layer and the second layer by heat-treating the composite sheet on which the second layer is formed, at 300 to 1,200° C.

First, step S210 of preparing the graphene ink composition including the first layer formed of metal and the chemically modified graphene is performed.

As metal, it is possible to use any one selected from a group consisting of Cu, Al, Ta, Ni, Co, Fe, Pt, Au, Cr, Mg, Mn, Mo, Rh, Ru, Si, Ta, Ti, W, U, V, Zr, brass, bronze, cupronickel, stainless steel, and Ge, and alloys thereof. Preferably, Cu can be used. This is because anodization can be prevented by connecting copper to the cathode in the process of forming the second layer to be described later.

On the other hand, the graphene ink composition may be formed by using the method S10 for producing the first colloid or the method M100 for producing the graphene ink composition. In the case of using the method S10 for producing the first colloid, the graphene ink composition includes the charged chemically modified graphene, and in the case of using the method M100 for producing the graphene ink composition, the graphene ink composition includes the charged chemically modified graphene and the graphene flake together.

After the preparation of the first layer and the graphene ink composition is finished, the second layer which is a graphene layer should be formed on the first layer.

In order to form the second layer, step S220 of immersing the first layer and the counter electrode in the graphene ink composition contained in the first reactor. In particular, the method M200 for producing the composite sheet for shielding electromagnetic and radiating heat according to another example of the present invention uses an electrophoretic deposition (EPD).

To this end, the first reactor is prepared, and then the first reactor is filled with the graphene ink composition prepared as described above. Thereafter, the first layer is connected to the cathode and the counter electrode is connected to the anode.

In this case, an amount of the charged chemically modified graphene or a total amount of the charged chemically modified graphene and the graphene flake may be included in an amount of 0.01 to 30 wt %, preferably 0.01 to 5 wt %, based on the total amount of the graphene ink composition. Stainless steel may be used as the counter electrode. However, instead of connecting the first layer directly to the cathode, it is also possible to use a separate pattern electrode in which gold is plated on copper. The first layer and the counter electrode are disposed to be spaced apart at a distance of 0.5 to 2 cm in the first reactor.

Next, step S230 of forming the second layer on the surface of the first layer by applying power to the cathode and the anode is performed. An applied voltage may be 0.5 to 20 V, and an application time may be 1 second to 1 hour.

A thickness and a shape of the second layer can be adjusted by adjusting the applied voltage or the application time.

On the other hand, after step S230 of forming the second layer is performed, a step of forming the first layer on the second layer may be performed again. In this case, the second layer may be formed by electroplating.

To this end, a solvent in which the metal of the cation contained in the second reactor is dissolved is prepared. Next, the first layer is formed on the surfaces of the second layer by electrically connecting the composite sheet on which the second layer is formed, connecting the counter electrode to the anode, immersing the composite sheet in a solution in which the metal of the cation is dissolved, in the second reactor, and applying power to the cathode and the anode. At this time, a silver nitrate ($AgNO_3$) solution may be used as the solution. In this case, the first layer formed on the surface of the second layer is Ag.

Furthermore, after the first layer and the second layer are formed, step M240 of improving the bonding force between the first layer and the second layer by heat-treating the composite sheet on which the second layer is formed, at 300 to 1,200° C. may be performed. However, the heat treatment is performed in an inert atmosphere.

Figure 5:
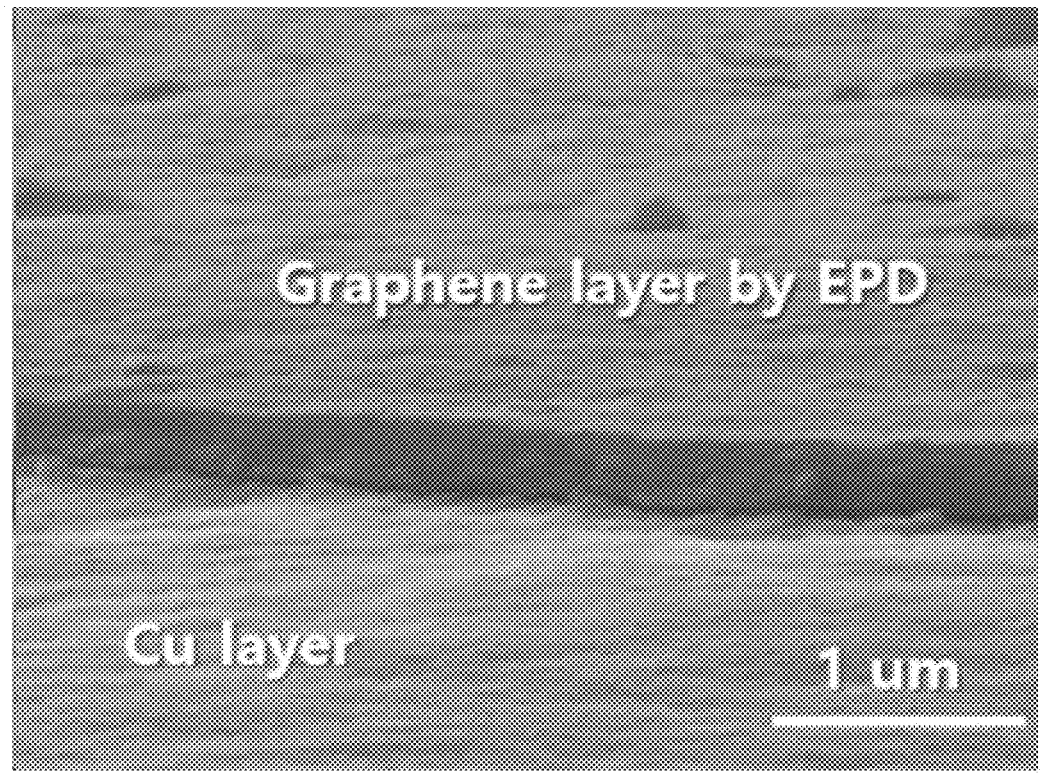
FIG. 5 is a sectional view of the composite sheet for shielding electromagnetic and radiating heat produced by the method for producing the composite sheet for shielding electromagnetic and radiating heat according to one example of the present invention, which is imaged by a scanning electron microscope (SEM).

FIG. 5 is a sectional view of the composite sheet for shielding electromagnetic and radiating heat produced by the method for producing the composite sheet for shielding electromagnetic and radiating heat according to one example of the present invention, which is imaged by a scanning electron microscope (SEM).

Referring to FIG. 5, it can be seen that there is no separate adhesive layer between the first layer and the second layer. As such, when there is no adhesive layer between the first layer and the second layer, there is an advantage of no thermal resistance between the two layers.

In conclusion, in the method M200 for producing the composite sheet for shielding electromagnetic and radiating heat according to another example of the present invention, the second layer is formed by the electrophoretic deposition, and, if necessary, the first layer is formed by the electroplating method, so that the composite sheet can be prepared without the adhesive layer.

A method for producing the composite sheet for shielding electromagnetic and radiating heat according to further another example of the present invention uses a sol-gel method. Specifically, the method can include a step of preparing a graphene ink composition including a first layer formed of metal, chemically modified graphene, and graphene flake; and a step of forming a second layer, which is a graphene layer including chemically modified graphene and graphene flake, on a surface of the first layer by a sol-gel method by immersing the first layer in the graphene ink composition. On the other hand, the graphene ink composition may be formed using the method M100 for producing the graphene ink composition.

Next, a configuration and an effect of the composite sheet for shielding electromagnetic and radiating heat produced as described above are considered.

Composite Sheet for Shielding Electromagnetic and Radiating Heat

Figure 6:
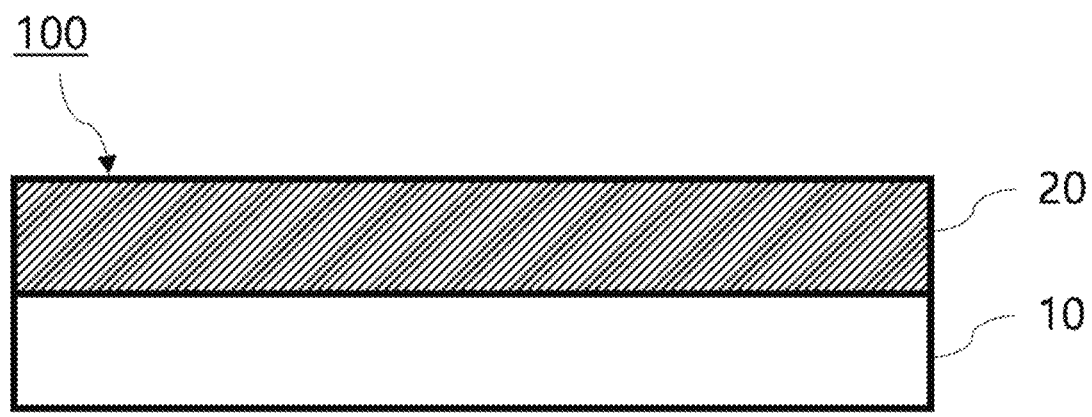
FIG. 6 is a schematic sectional view of a composite sheet for shielding electromagnetic and radiating heat according to another example of the present invention.

FIG. 6 is a schematic sectional view of a composite sheet 100 for shielding electromagnetic and radiating heat according to another example of the present invention.

Referring to FIG. 6, in the other example of the present invention, the composite sheet 100 for shielding electromagnetic and radiating heat includes a first layer 10 and a second layer 20.

The first layer 10 is formed of metal, and as the metal, it is possible to use any one selected from a group consisting of Cu, Al, Ta, Ni, Co, Fe, Pt, Au, Cr, Mg, Mn, Mo, Rh, Ru, Si, Ta, Ti, W, U, V, Zr, brass, bronze, cupronickel, stainless steel, and Ge, or alloys thereof.

The second layer 20 is formed on at least one surface of the first layer 10. There is no separate adhesive layer between the first layer 10 and the second layer 20, and thus there is no heat resistance layer.

The second layer 20 is a graphene layer. The second layer 20 may include charged chemically modified graphene or may further include graphene flake together with the charged chemically modified graphene. The second layer 20 may have a thickness of 0.05 to 3 μm, and when the thickness exceeds 3 μm, there is a problem that the flexibility of the composite sheet may be significantly reduced.

Figure 7:
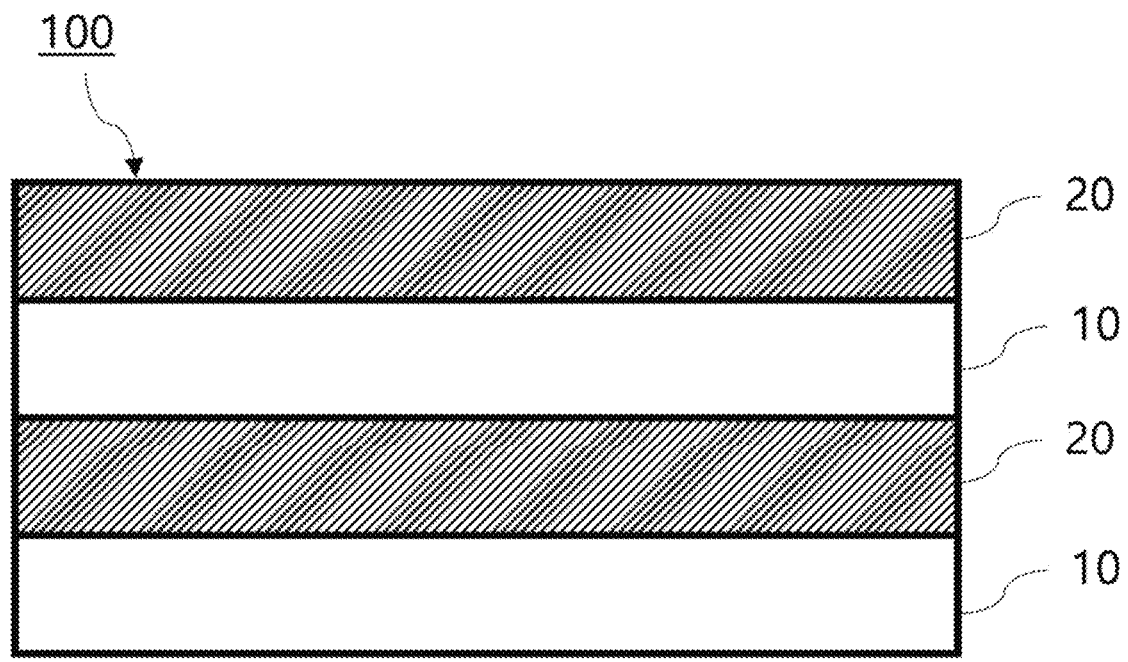
FIG. 7 is a schematic sectional view of a heat radiation and shielding composite sheet according to further another example of the present invention, for explaining an embodiment in which a first layer and a second layer are alternately formed.

The composite sheet 100 for shielding electromagnetic and radiating heat according to further another example of the present invention can be formed in a multi-layer as illustrated in FIG. 7. In this case, the first layer 10 and the second layer 20 may be alternately stacked. In addition, the first layers 10 do not have to be all formed of the same material or composition. For example, the first layer may be formed of Al, and the secondary first layer may be formed of Cu. The same is applied to the second layer 20, and it is also possible to vary the amount of the charged chemically modified graphene and/or the graphene flake in each layer.

The heat radiation performance and the shielding performance of the composite sheet for shielding electromagnetic and radiating heat according to further another example of the present invention were evaluated, respectively.

First, the heat radiation performance was evaluated, and results thereof are illustrated in the following Table 4. The heat radiation performance evaluation was performed by measuring a temperature change of each comparative example and the example using an aluminum foil as a test subject in which an LED lamp is installed. It was compared after a temperature of the test subject is measured with an infrared thermometer after 1 hour after attaching a heat radiation sheet to the test subject of which an initial temperature is set to 100° C.

TABLE 4

|  | Comparative Example 1 | Comparative Example 2 | Example 1 | Example 2 |
|---|---|---|---|---|
| structure of composite sheet | first layer (Cu, 25 μm) | first layer (Cu, 25 μm) adhesive layer (5 μm) second layer (graphite, 10 μm) | first layer (Cu, 25 μm) second layer (graphene*, 700 nm) | first layer (Cu, 12 μm) second layer (graphene*, 700 nm) first layer (Cu, 12 μm) second layer (graphene*, 700 nm) |
| temperature of test subject (before) | 100° C. | 100° C. | 100° C. | 100° C. |
| temperature of test subject (after) | 86° C. | 83° C. | 76° C. | 73° C. |

*graphene: it means that the charged chemically modified graphene and the graphite flake are provided together in Table 4.

Referring to Table 4, it can be seen that Examples 1 and 2 have a total thickness is equal to or thinner than that of the comparative example, but the temperature of the test subject of Examples 1 and 2 is lower than that of the comparative example. This is determined to be due to improved vertical thermal conductivity of the second layer including the charged chemically modified graphene and the graphene flake.

Next, the evaluation of the shielding performance was carried out, and results thereof are illustrated in the following Table 5. The shielding performance was evaluated by using a Network analyzer to verify the electromagnetic shielding performance in an X-band region and the shield effectiveness measurement value appears at 10 GHz.

TABLE 5

|  | Comparative Example 1 | Comparative Example 2 | Example 1 | Example 2 |
|---|---|---|---|---|
| structure of composite sheet | first layer (Al, 25 μm) | first layer (10% graphene flake Polymer complex, 1 mm) | first layer (Al, 20 μm) second layer (graphene*, 700 nm) | first layer (Al, 8 μm) second layer (graphene*, 700 nm) first layer (Al, 8 μm) second layer (graphene*, 700 nm) |
| Shield Effectiveness @10 GHz | 65 dB | 17 dB | 71 dB | 92 dB |

*graphene: it means that the charged chemically modified graphene and the graphite flake are provided together in Table 5.

Referring to Table 5, in the case of Example 1, it can be seen that a shielding rate is slightly improved compared to that of Comparative Example 1. In particular, in the case of Example 2, it can be seen that Example 2 illustrates a shielding efficiency increased by 141% with a thinner thickness than that of Example 1.

The scope of protection of the present invention is not limited to the description and expression of the examples explicitly described above. In addition, it is again noted that the scope of protection of the present invention may not be limited due to obvious changes or substitutions in the technical field to which the present invention belongs.

What is claimed is:

1. A method for producing a composite sheet for shielding electromagnetic and radiating heat, the method comprising:
    a step of preparing a graphene ink composition comprising only a charged chemically modified graphene and graphene flake, wherein
        element contents of the charged chemically modified graphene are 76 to 85 atomic % carbon, 5 to 22 atomic % oxygen, and 2 to 18 atomic % nitrogen, and $|O-N|>3$,
        element contents of the graphene flake is 90 to 99.4 atomic % carbon, 0.5 to 5 atomic % oxygen, and 0.1 to 5 atomic % nitrogen, and
        a weight ratio between the charged chemically modified graphene and the graphene flake is 1:399 to 1:1,999;
    a step of preparing a first layer formed on a metal;
    a step of depositing the first layer and a counter electrode in the graphene ink composition contained in a first reactor by electrically connecting the first layer to a cathode, and connecting the counter electrode to an anode; and
    a step of forming a second layer, which is a graphene layer, on a surface of the first layer by applying power to the cathode and the anode.

2. The method for producing a composite sheet for shielding electromagnetic and radiating heat according to claim 1, wherein
    the step of preparing the graphene ink composition includes:
    a step of preparing a first colloid in which charged chemically modified graphene is dispersed;
    a step of preparing a second colloid in which graphene flake is dispersed; and
    a step of producing a graphene ink composition by mixing the first colloid, the second colloid, a binder, and a solvent.

3. The method for producing a composite sheet for shielding electromagnetic and radiating heat according to claim 2, wherein
    the step of preparing the first colloid includes:
    a step of preparing expanded graphite oxide by treating the graphite flake with an oxidizing agent and irradiating the graphite flake with microwaves;
    a step of preparing graphene oxide by exfoliating the expanded graphite oxide;
    a step of preparing a graphene oxide suspension by mixing the prepared graphene oxide with deionized water; and
    a step of producing the first colloid including the charged chemically modified graphene through a circulating ultrasonic dispersion system after adding and stirring an additive for modifying graphene in the graphene oxide suspension.

4. The method for producing a composite sheet for shielding electromagnetic and radiating heat according to claim 3, wherein
    the additive is any one of an organic single molecule or a polymer having an amine group, a hydroxy group, or an azide group.

5. The method for producing a composite sheet for shielding electromagnetic and radiating heat according to claim 2, wherein
    the step of preparing the second colloid includes:
    a step of preparing expanded graphite;
    a step of preparing the graphene flake by exfoliating the expanded graphite; and
    a step of producing the second colloid by dispersing the exfoliated graphene flake.

6. The method for producing a composite sheet for shielding electromagnetic and radiating heat according to claim 1, wherein
    after executing the step of forming the second layer,
    the method further comprising:
    a step of immersing the composite sheet and a counter electrode by electrically connecting the composite sheet on which the second layer is formed to the cathode, and connecting the counter electrode to the anode; and
    a step of forming the first layer additionally on a surface of the second layer by applying power to the cathode and the anode.

7. The method for producing a composite sheet for shielding electromagnetic and radiating heat according to claim 1, further comprising:
    a step of improving a bonding force between the first layer and the second layer by heat-treating the composite sheet on which the second layer is formed at 300 to 1,200° C.

* * * * *